United States Patent [19]
Kim et al.

[11] Patent Number: 5,784,131
[45] Date of Patent: Jul. 21, 1998

[54] METHOD FOR FABRICATING LIQUID CRYSTAL DISPLAY IN WHICH THE PIXEL ELECTRODE HAS A PARTICULAR CONNECTION TO THE DRAIN ELECTRODE AND IS FORMED OVER A STORAGE CAPACITOR

[75] Inventors: Hong-Gyu Kim, Kyungki-do; Kyung-Seob Han; Ho-Young Lee, both of Seoul, all of Rep. of Korea

[73] Assignee: LG Semicon Co., Ltd., Chungcheongbuk-Do, Rep. of Korea

[21] Appl. No.: 733,095

[22] Filed: Oct. 16, 1996

[30] Foreign Application Priority Data

Oct. 20, 1985 [KR] Rep. of Korea ............... 1995-36363

[51] Int. Cl.[6] ............... G02F 1/1343; G02F 1/136; G02F 1/13
[52] U.S. Cl. ............... 349/39; 349/43; 349/187
[58] Field of Search ............... 349/39, 43, 187

[56] References Cited

U.S. PATENT DOCUMENTS 4,648,691  3/1987  Oguchi et al. ............... 349/43

*Primary Examiner*—William L. Sikes
*Assistant Examiner*—Walter Malinowski
*Attorney, Agent, or Firm*—John P. White; Cooper & Dunham LLP

[57] ABSTRACT

Method for fabricating a liquid crystal display, is disclosed, including the steps of forming a first semiconductor layer in a thin film transistor region on a substrate and forming a second semiconductor layer in a storage capacitor region on the substrate, forming a gate insulating film on the first, and second semiconductor layers and forming a gate electrode over the first semiconductor layer in the thin film transistor region, injecting impurity ions into entire surface of the substrate using the gate electrode as a mask in forming a source region and a drain region in the first semiconductor layer, forming a first interlayer insulating film on entire surface of the substrate including the gate electrode and forming a first contact hole such that the first contact hole exposes the source region, forming a data line on a part of the first interlayer insulating film such that the data line is connected to the source region through the first contact hole, forming a second interlayer insulating film on entire surface of the substrate including the data line and forming second, third contact holes such that the second, and third contact holes expose the gate insulating film on the second semiconductor layer and the drain region respectively and forming a pixel electrode on the second interlayer insulating film such that the pixel electrode is connected to the gate insulating film on the second semiconductor layer and the drain region through the second and third contact holes respectively and forming a protection film on entire surface including the pixel electrode, whereby a numerical aperture can be improving allowing improvement of picture quality.

3 Claims, 8 Drawing Sheets

METHOD FOR FABRICATING LIQUID CRYSTAL DISPLAY IN WHICH THE PIXEL ELECTRODE HAS A PARTICULAR CONNECTION TO THE DRAIN ELECTRODE AND IS FORMED OVER A STORAGE CAPACITOR

BACKGROUND OF THE INVENTION

1. Field of the Invention

The present invention relates to a liquid crystal display, and more particularly to a liquid crystal display in which a storage capacitor portion is formed transparent for improving aperture ratio.

2. Discussion of the Related Art

A prior art liquid crystal display will be explained with reference to the attached drawings.

FIGS. 1a and 1b are a layout and a circuit diagram of a prior art liquid crystal display respectively, and FIGS. 2a–2h illustrate sections across the line A—A' in FIG. 1a showing process steps of a method for fabricating a liquid crystal display.

Referring to FIG. 2a, poly-si is formed on a transparent insulating substrate 1, such as glass or quartz and patterned to form a semiconductor layer 2 of an island form. As shown in FIG. 2b, a photoresist 3 is formed on entire surface of the transparent insulating substrate 1 and patterned so as to expose a predetermined portion of the semiconductor layer 2 for forming underside electrode of a storage capacitor, and using the photoresist 3 as a mask, phosphorus or boron ions are injected therein. As shown in FIG. 2c, the photoresist is removed and a gate insulating film 4 is formed on the semiconductor layer 2. A conductive film is formed on entire surface of the substrate I including the gate insulating film 4 and patterned to form gate electrodes 5 on regions in which a channel region of a thin film transistor and a storage capacitor of pixel regions are to be formed, respectively. In this instant, the gate electrode 5 pattern in the storage capacitor region forms an upperside electrode of the storage capacitor. As shown in FIG. 2d, using the gate electrode 5 as a mask, phosphorus or boron ions are injected into the semiconductor layer 2 and heat treated to form source/drain regions of a thin film transistor. Then, as shown in FIG. 2e, a first interlayer insulating film 6 is formed on entire surface of the substrate 1 including the gate electrodes 5 for insulating layers, and the gate insulating film 4 and the first interlayer insulating film 6 on the source region are removed such that a portion of the source region is exposed, to form a metal contact hole 7. As shown in FIG. 2f, a data line 8 is formed on a part of the first interlayer insulating film so that the data line 8 is connected to the source region through the first contact hole 7. As shown in FIG. 2g, a second interlayer insulating film 9 is formed on entire surface of the substrate 1 including the data line 8, and a portion of each of the gate insulating film 4 and the first, and second interlayer insulating films 6 and 9 above the drain region are removed such that a portion of the drain region is exposed, to form a second contact hole 10. And, as shown in FIG. 2h, a pixel electrode 11 is formed such that the pixel electrode 11 is connected to the drain region through the second contact hole 10 and a protective film 12 is formed on entire surface of the substrate 1 including the pixel electrode 11. And, though it is not shown in the drawings, a pad open process is conducted for completion of an underside panel of the liquid crystal display.

However, the aforementioned prior art method for fabricating a liquid crystal display has the following problems.

First, since the storage capacitor has a system of the semiconductor layer-the gate insulating film-the gate electrode, the liquid crystal display has a low aperture ratio, because the opaque gate electrode reduces the aperture ratio as much as the area the storage capacitor occupies(20~30% of a pixel area).

Second, the difficulty in removing the photoresist used as a mask after the injection of impurities into the semiconductor layer for forming the underside electrode of the storage capacitor causes damages to surface portions of the semiconductor layer with which a thin film transistor is formed, resulting in a great degradation of produced device with consequential drop of the quality of the produced panel.

Third, the pixel electrode should satisfy the step coverage formed by stacking of the gate insulating film and the first, and second interlayer insulating film. However, a thickness of the step coverage is in general about 1.5 µm, the pixel electrode hardly covers this step coverage.

SUMMARY OF THE INVENTION

Accordingly, the present invention is directed to a method for fabricating a liquid crystal display that substantially obviates one or more of the problems due to limitations and disadvantages of the related art.

An object of the present invention is to provide a method for fabricating a liquid crystal display which is suitable for improving current aperture ratio and performance of the device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for fabricating a liquid crystal display includes the steps of forming a first semiconductor layer in a thin film transistor region on a substrate and forming a second semiconductor layer in a storage capacitor region on the substrate, forming a gate insulating film on the first, and second semiconductor layers and forming a gate electrode over the first semiconductor layer in the thin film transistor region, injecting impurity ions into entire surface of the substrate using-the gate electrode as a mask in forming a source region and a drain region in the first semiconductor layer, forming a first interlayer insulating film on entire surface of the substrate including the gate electrode and forming a first contact hole such that the first contact hole exposes the source region, forming a data line on a part of the first interlayer insulating film such that the data line is connected to the source region through the first contact hole, forming a second interlayer insulating film on entire surface of the substrate including the data line and forming second, third contact holes such that the second, and third contact holes expose the gate insulating film on the second semiconductor layer and the drain region respectively, and forming a pixel electrode on the second interlayer insulating film such that the pixel electrode is connected to the gate insulating film on the second semiconductor layer and the drain region through the first, and second contact holes respectively and forming a protection film on entire surface including the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
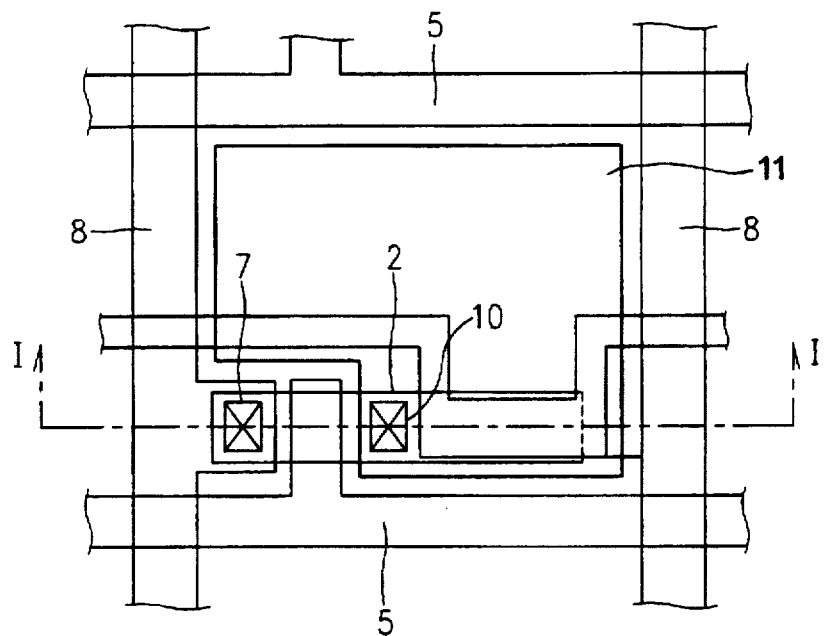
FIGS. 1a and 1b are a layout and a circuit diagram showing a prior art liquid crystal display.
Figure 1B:
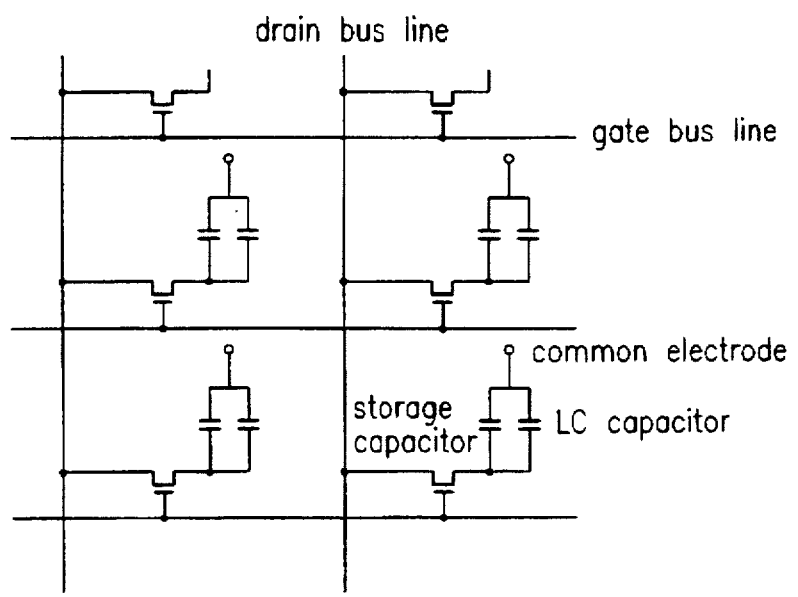
Figure 2A:
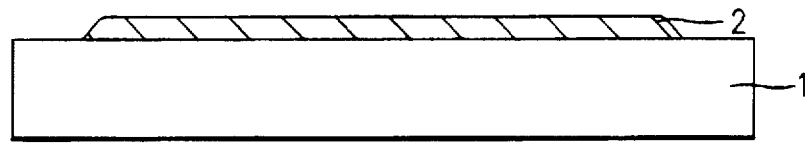
FIGS. 2a–2h illustrate sections across A—A' line in FIG. 1a showing process steps of a method for fabricating a liquid crystal display.
Figure 2B:
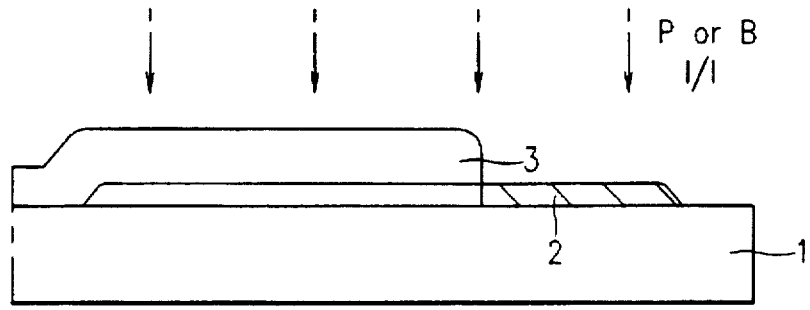
Figure 2C:
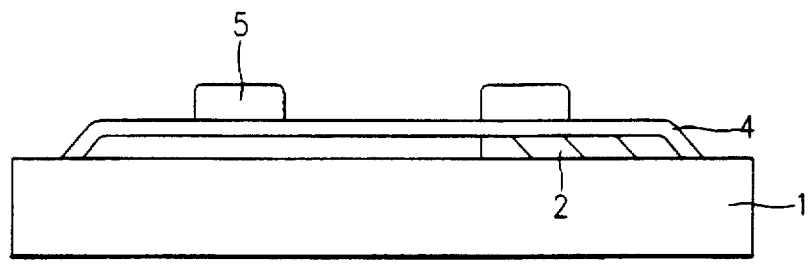
Figure 2D:
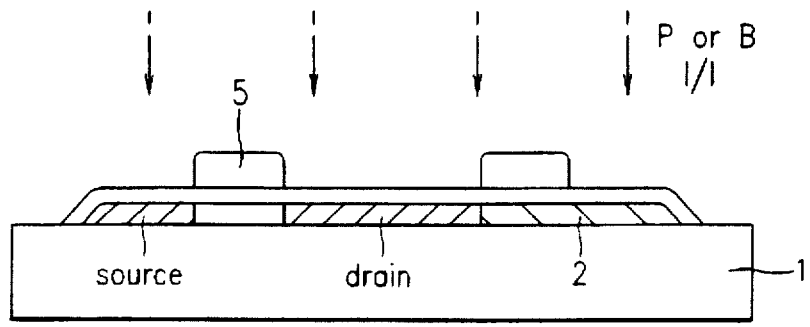
Figure 2E:
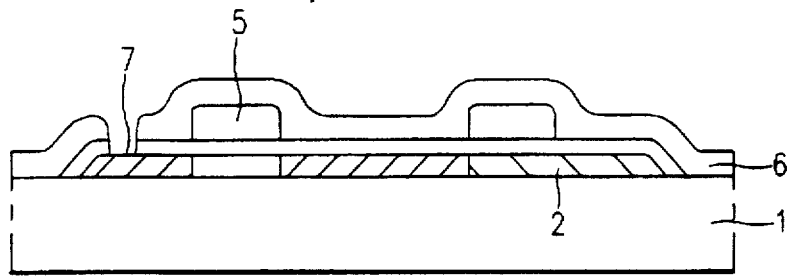
Figure 2F:
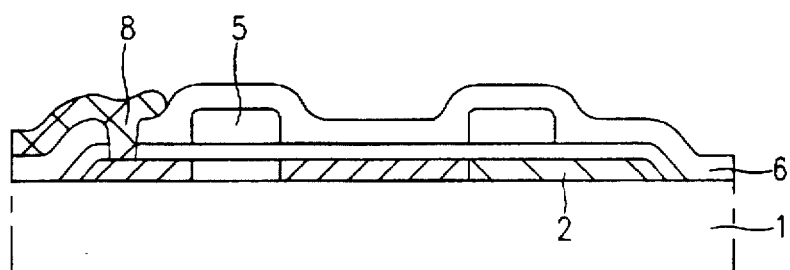
Figure 2G:
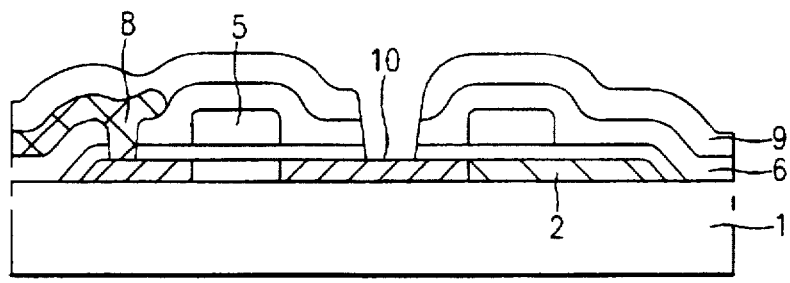
Figure 2H:
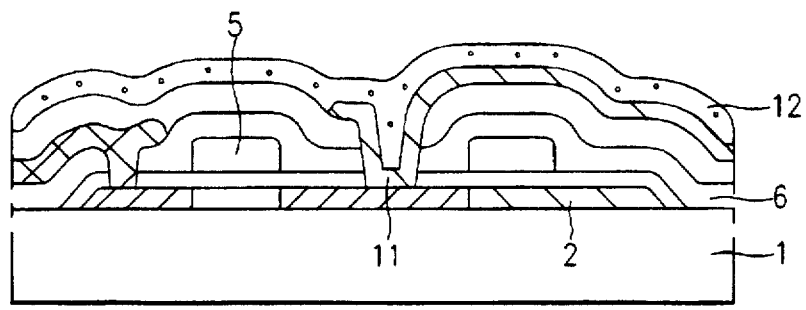
Figure 3A:
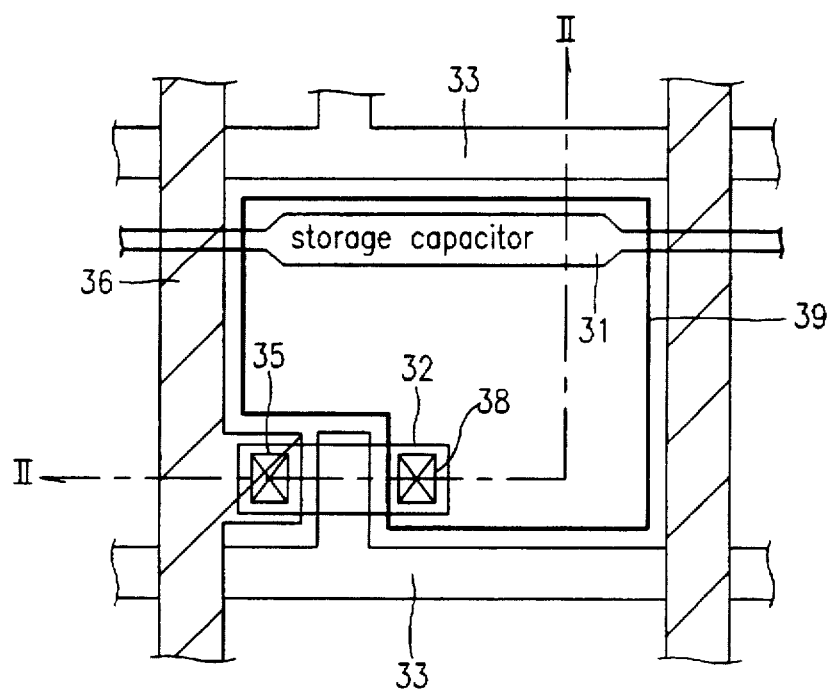
FIGS. 3a and 3b are a layout and a circuit diagram showing a liquid crystal display in accordance with a preferred embodiment of the present invention.
Figure 3B:
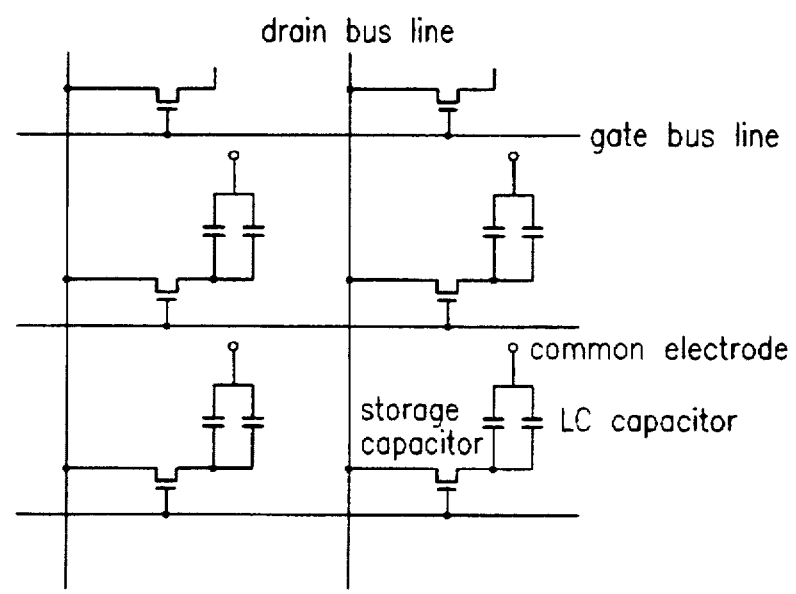

FIGS. 3a and 3b are a layout and a circuit diagram showing a liquid crystal display in accordance with a preferred embodiment of the present invention, and FIGS. 4a–4h illustrate sections across B—B' line in FIG. 3a showing process steps of a method for fabricating a liquid crystal display in accordance with a preferred embodiment of the present invention.

Figure 4A:
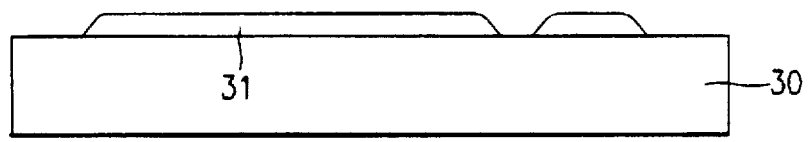
FIGS. 4a–4h illustrate sections across B—B' line in FIG. 3a showing process steps of a method for fabricating a liquid crystal display in accordance with a preferred embodiment of the present invention; and, FIGS. 5a–5h illustrate sections across B—B' line in FIG. 3a showing process steps of a method for fabricating a liquid crystal display in accordance with another preferred embodiment of the present invention.
Figure 4B:
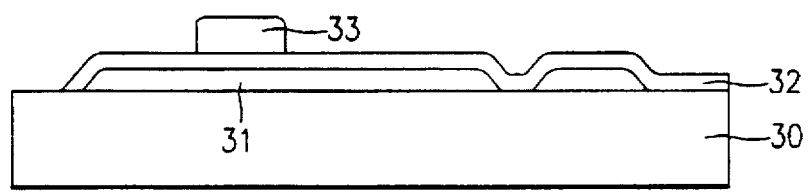
Figure 4C:
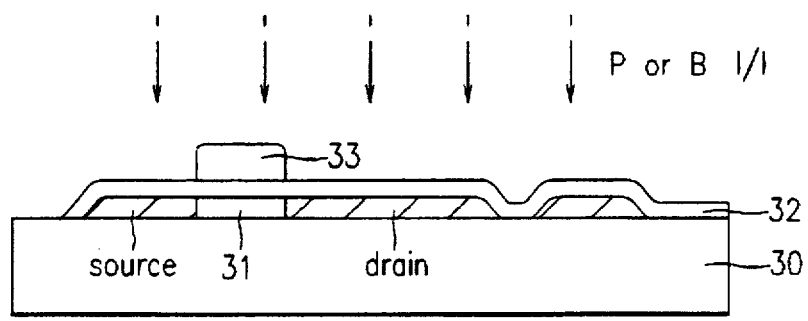
Figure 4D:
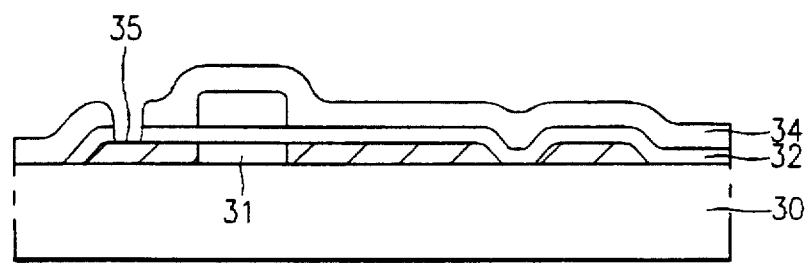
Figure 4E:
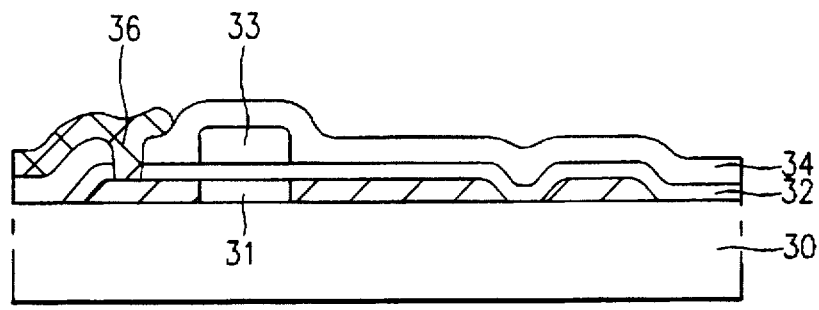
Figure 4F:
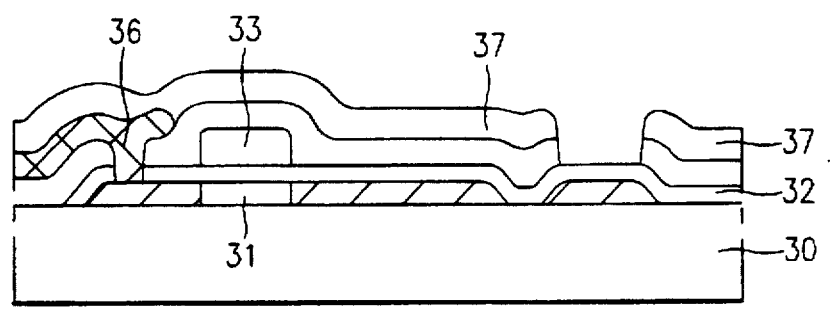
Figure 4G:
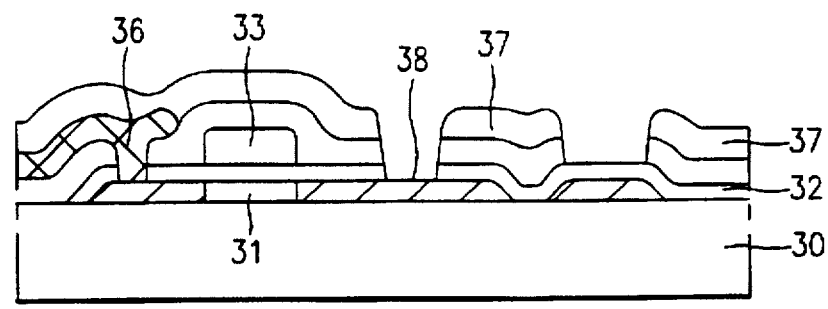
Figure 4H:
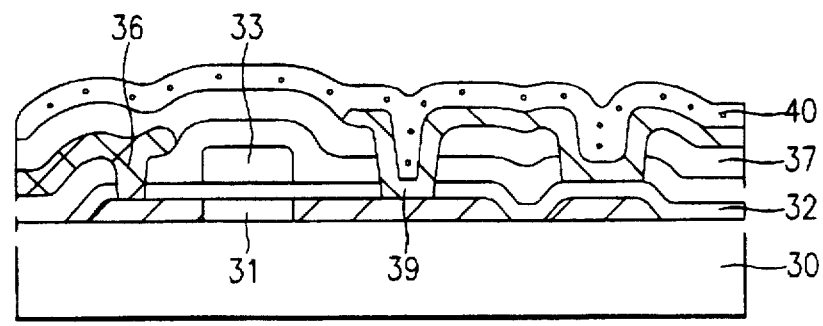

Referring to FIG. 4a, a poly-si layer is formed on a transparent insulating substrate 30, such as glass or quartz and patterned to form semiconductor layers 31 in a thin film transistor region and storage capacitor region, respectively. As shown in FIG. 4b, a gate insulating film 32 is formed on entire surface of the substrate 30 including the semiconductor layers 31, and a conductive film is formed on the gate insulating film 32 and patterned to form a gate electrode 33 on the semiconductor layer 31 in the thin film transistor region. In this instant, the conductive film is patterned such that the conductive film is not remained in the storage capacitor region. As shown in FIG. 4c, phosphorus or boron ions are injected into the semiconductor layer 31 and heat treated to form source, and drain regions and an underside electrode of a storage capacitor. Then, as shown in FIG. 4d, a first interlayer insulating film 34 is formed on entire surface of the substrate 30 including the gate electrode 33, and the gate insulating film 32 and the first interlayer insulating film 34 are removed such that a portion of the source region is exposed, to form a first contact hole 35. As shown in FIG. 4e, a metal film is formed on the first interlayer insulating film 34 and patterned to form a data line 36 such that the data line is in contact with the source region through the first contact hole. As shown in FIG. 4f, a second interlayer insulating film 37 is formed on entire surface of the substrate 30 including the data line 36, and the first, and second interlayer insulating films 34 and 37 in the storage capacitor region are removed to expose a portion of the gate insulating film 32. And, as shown in FIG. 4g, the first, and second interlayer insulating films 34 and 37 and the gate insulating film 32 above the drain region are removed such that a portion of the drain region is exposed, to form a second contact hole 38. Then, as shown in FIG. 4h, a transparent conductive film of, such as ITO is formed on entire surface of the substrate 30 including the second interlayer insulating film 37 and patterned, so that the transparent conductive film is connected to the drain region through the second contact hole 38 and to form a pixel electrode 39 in the pixel region including the storage capacitor region. A protection film 40 is formed on entire surface of the substrate 30 including the pixel electrode 39, and, though not shown, a pad open process is conducted to complete formation of an underside panel of the liquid crystal display.

FIGS. 5a–5h illustrate sections across B—B' line in FIG. 3a showing process steps of a method for fabricating a liquid crystal display in accordance with another preferred embodiment of the present invention.

The process steps shown in FIGS. 5a–5e are identical to the process steps shown in FIGS. 3a–3e, respectively.

Figure 5A:
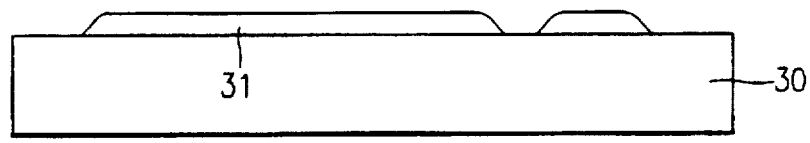
Figure 5B:
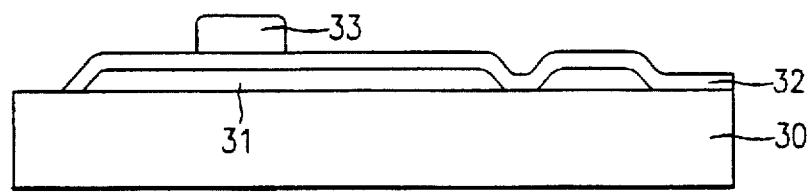
Figure 5C:
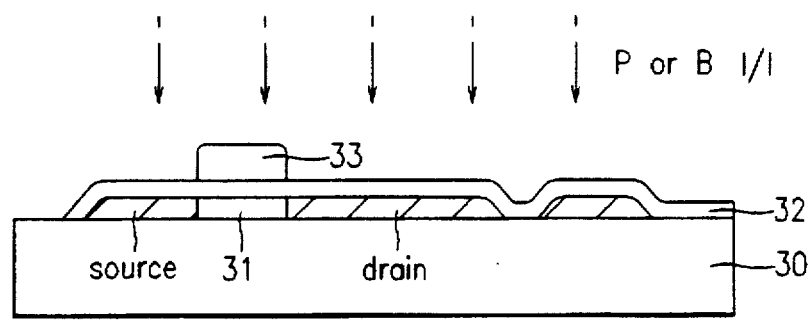
Figure 5D:
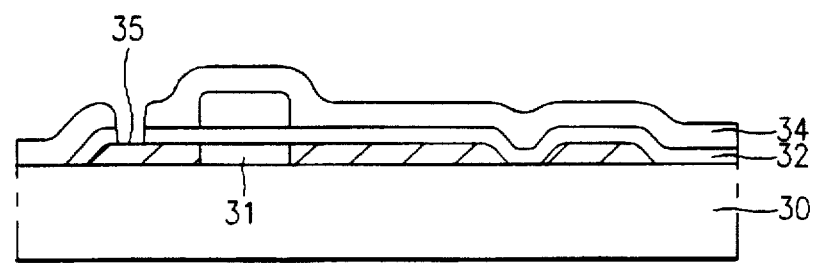
Figure 5E:
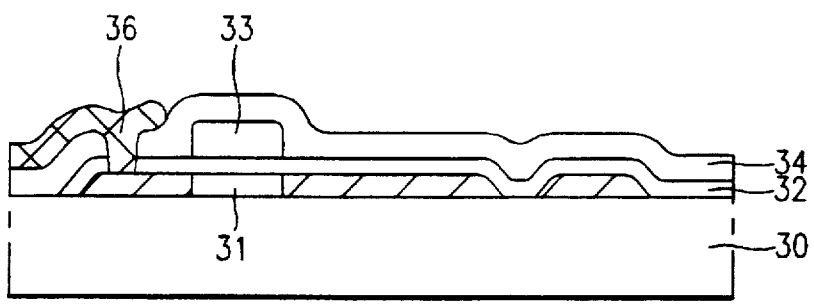
Figure 5F:
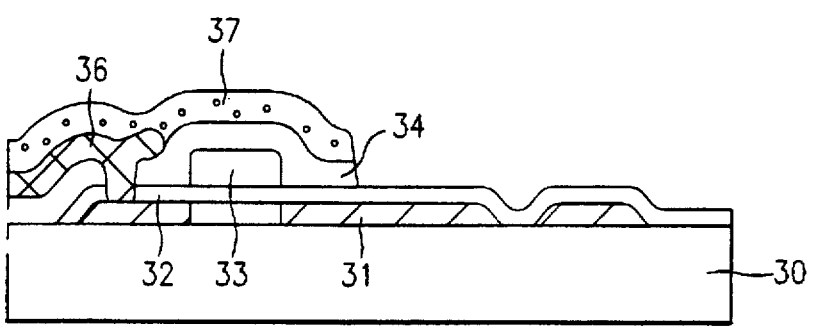
Figure 5G:
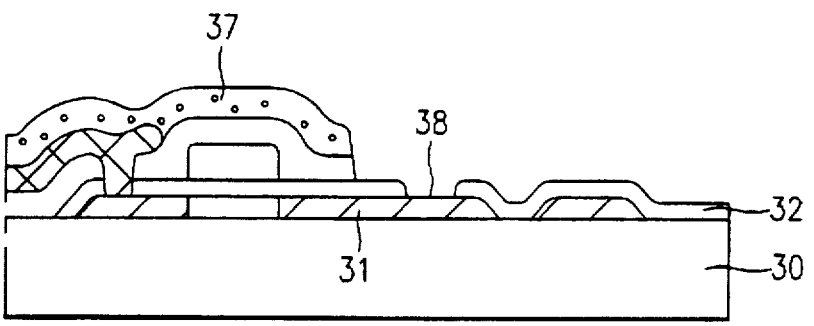
Figure 5H:
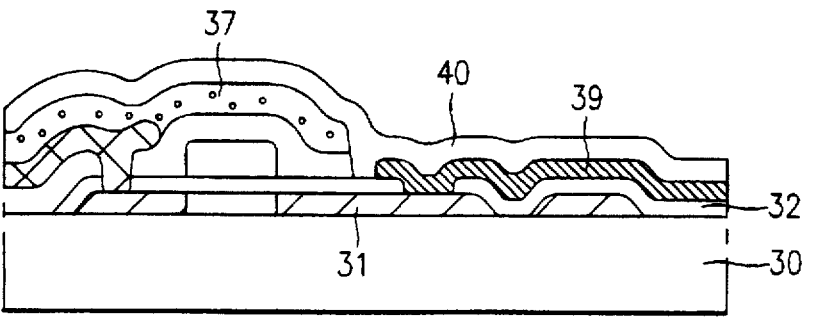

Referring to FIG. 5f, a second interlayer insulating film 37 is formed on entire surface of the substrate 30 including the data line 38, and the first, and second interlayer insulating films 34 and 37 in the pixel region including a portion of the drain region and the storage capacitor region are removed to expose the gate insulating film 32. In this instant, the gate insulating film 32 and the first, and second interlayer insulating films 34 and 37 should be so formed that they have etch selectivities different from the other. For example, in case the gate insulating film 32 is formed of silicon oxide, the first, and second interlayer insulating films 34 and 37 are formed of a silicon nitride, and vice versa. Then, as shown in FIG. 5g, a portion of the gate insulating film is removed so that the drain region is exposed, to form a second contact hole 38. As shown in FIG. 5h, a transparent conductive film of, such as ITO is formed on entire surface of the substrate 30 including the second insulating film 37 and patterned, so that the transparent conductive film is connected to the drain region through the contact hole 38 and a pixel electrode 39 is formed on the pixel region including the storage capacitor region.

The method for fabricating a liquid crystal display of the present invention has the following advantages.

First, the storage capacitor formed transparent improves a aperture ratio as well as a picture quality.

Second, as the problem of step coverage of the pixel electrode is solved, a production yield can be improved.

Third, since there is no damage to the semiconductor layer like in the prior art, performance of device can be improved.

It will be apparent to those skilled in the art that various modifications and variations can be made in method for fabricating semiconductor device of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display, the liquid crystal display including a thin film transistor and a storage capacitor, the method comprising the steps of:

forming a first semiconductor layer in a thin transistor region on a substrate and forming a second semiconductor layer in a storage capacitor region on the substrate;

forming a gate insulating film on the first and second semiconductor layers and forming a gate electrode over said first semiconductor layer in the thin film transistor region;

injecting impurity ions into an entire surface of the substrate using the gate electrode over the first semiconductor layer in the thin film transistor region;

forming a first interlayer insulating film on said entire surface of the substrate including the gate electrode and forming a first contact hole such that the first contact hole exposes the source region;

forming a data line on a part of the first interlayer insulating film such that the data line is connected to the source region through the first contact hole;

forming a second interlayer insulating film on said entire surface of the substrate including the data line and forming second and third contact holes such that the second and third contact holes expose the gate insulating film on the second semiconductor layer and the drain region respectively; and forming a pixel electrode on the second interlayer insulating film such that the pixel electrode is connected to the gate insulating film on the second semiconductor layer and the drain region through the second and third contact holes respectively and forming a protection film on said entire surface including the pixel electrode.

2. A method as claimed in claim 1, wherein the step of forming a pixel electrode includes the the steps of, removing the first and second interlayer insulating films in the drain region and the pixel region including the second semiconductor layer for exposing the gate insulating film, removing a portion of the gate insulating film such that the drain region is exposed to form a contact hole, and forming the pixel electrode in the pixel region such that the pixel electrode is connected to the drain region through the contact hole.

3. A method as claimed in claim 2, wherein the first and second interlayer insulating films are formed of a material having an etch selectivity different from the gate insulating film.

* * * * *